United States Patent [19]
Sachs

[11] Patent Number: 5,483,259
[45] Date of Patent: Jan. 9, 1996

[54] COLOR CALIBRATION OF DISPLAY DEVICES

[75] Inventor: Jonathan M. Sachs, Cambridge, Mass.

[73] Assignee: Digital Light & Color Inc., Cambridge, Mass.

[21] Appl. No.: 226,779

[22] Filed: Apr. 12, 1994

[51] Int. Cl.⁶ .......................... G09G 1/28; H04N 17/00
[52] U.S. Cl. .......................... 345/153; 345/904; 348/189; 348/674
[58] Field of Search .......................... 345/150, 153, 345/904, 154; 348/180–186, 189–191, 674; 358/504, 515, 527; 324/121 R; H04N 17/00

[56] References Cited

U.S. PATENT DOCUMENTS

| | | | |
|---|---|---|---|
| 3,443,868 | 5/1969 | Mitchell | 355/32 |
| 4,037,249 | 7/1977 | Pugsley | 358/76 |
| 4,200,365 | 4/1980 | Keondjian et al. | 353/29 |
| 4,207,589 | 6/1980 | Kawasaki | 358/28 |
| 4,406,971 | 9/1983 | Takano et al. | 348/189 |
| 4,415,921 | 11/1983 | Mulvanny et al. | 358/139 |
| 4,500,919 | 2/1985 | Schreiber | 358/78 |
| 4,530,011 | 7/1985 | Haddick | 358/244 |
| 4,547,797 | 10/1985 | Mick | 358/27 |
| 4,593,309 | 6/1986 | Uno et al. | 348/191 |
| 4,631,576 | 12/1986 | St. John | 358/65 |
| 4,700,218 | 10/1987 | Thomsen et al. | 348/180 |
| 4,760,447 | 7/1988 | Koka et al. | 358/139 |
| 4,812,879 | 3/1989 | Suzuki | 355/38 |
| 4,875,032 | 10/1989 | McManus | 345/154 |
| 5,012,299 | 4/1991 | Sawamura et al. | 355/326 |
| 5,103,407 | 4/1992 | Gabor | 395/131 |
| 5,111,243 | 5/1992 | Hatano | 355/209 |
| 5,119,182 | 6/1992 | Tsuboi et al. | 358/75 |
| 5,121,198 | 6/1992 | Maronian | 358/527 |
| 5,122,708 | 6/1992 | Donofrio | 313/470 |
| 5,155,588 | 10/1992 | Levien | 358/80 |
| 5,172,224 | 12/1992 | Collette et al. | 358/515 |
| 5,212,546 | 5/1993 | Arazi et al. | 358/80 |
| 5,218,671 | 6/1993 | Liao et al. | 345/150 |
| 5,247,358 | 9/1993 | Richards | 348/189 |
| 5,254,978 | 10/1993 | Beretta | 345/150 |
| 5,311,294 | 5/1994 | Cromer et al. | 345/904 |
| 5,313,273 | 5/1994 | Griffin et al. | 348/189 |
| 5,325,195 | 6/1994 | Ellis et al. | 348/189 |
| 5,334,992 | 8/1994 | Rochat et al. | 345/150 |
| 5,345,315 | 9/1994 | Shalit | 358/504 |

OTHER PUBLICATIONS

Eli Peli; Display Nonlinearity in Digital Image Processing for Visual Communications; Nov. 1992; Harvard Medical School, Boston, Mass.

Edwin Catmull; A Tutorial on Compensation Tables; 1979; Old Westbury, New York.

William B. Cowan; An Inexpensive Scheme for Calibration of a Colour Monitor in Terms of Cie Standard Coordinates; Jul. 1983; Ontario, Canada.

Marcel P. Lucassen et al.; Evaluation of a Simple Method for Color Monitor Recalibration; Dec. 1990; Soesterberg, The Netherlands.

*Primary Examiner*—Richard Hjerpe
*Assistant Examiner*—Steven J. Saras
*Attorney, Agent, or Firm*—Fish & Richardson

[57] ABSTRACT

Methods for calibrating a display device, for instance, a computer monitor, that transduces digital inputs to regions of perceived color. The brightness control is calibrated by (1) supplying to the display device digital inputs that produce a black area and an adjacent dark gray area; (2) adjusting the brightness control of the display so that the black area and the gray area are distinguishable; and (3) slowly reducing the brightness control to the point that the black area and the gray area are indistinguishable. Also, the digital-input-to-perceived-color transducing of the display device is calibrated by: (1) supplying digital inputs to produce a white area and one or more color patch areas each having a perceived color other than white; (2) overlaying on the white area one or more filter chips that each produce a desired reference color; and (3) conforming the perceived color of each color patch and the perceived color produced by the corresponding filter chip by adjusting the digital input for the color patch or the filter value of the filter chip.

5 Claims, 7 Drawing Sheets convert_HSV_to_RGB(H,S,V) returning (R,G,B)
    *check for the achromatic case*
    if S=0 then
        if H=Undefined then
            (R,G,B) = (V,V,V)
        else
            if H *has a value an error has been made*
        end if
    else
        *chromatic case*
        if H=360 then
            H=0
        else
            H=H/60
            I=Floor(H)
            F=H-I
            M=V*(1-S)
            N=V*(1-S*F)
            K=V*(1-S*(1-F))
            if I=0 then (R,G,B)=(V,K,M)
            if I=1 then (R,G,B)=(N,V,M)
            if I=2 then (R,G,B)=(M,V,K)
            if I=3 then (R,G,B)=(M,N,V)
            if I=4 then (R,G,B)=(K,M,V)
            if I=5 then (R,G,B)=(V,M,N)
        end if
    end if
finish

FIG. 6a

```
convert_RGB_to_HSV(R,G,B) returning (H,S,V)
    determine the value
    V=Max(R,G,B)
    determine saturation
    Temp=Min(R,G,B)
    if V=0 then
        S=0
    else
        S=(V-Temp)/V
    end if
    determine the hue
    if S=0 then
        H=Undefined
    else
        Cr=(V-R)/(V-Temp)
        Cg=(V-G)/(V-Temp)
        Cb=(V-B)/(V-Temp)
        the color is between yellow and magenta
        if R=V then H=Cb-Cg
        the color is between cyan and yellow
        if G=V then H=2+Cr-Cb
        the color is between magenta and cyan
        if B=V then H=4+Cg-Cr
        convert to degrees
        H=60*H
        prevent negative value
        if H<0 then H=H+360
    end if
finish
```

FIG. 6b

COLOR CALIBRATION OF DISPLAY DEVICES

REFERENCE TO APPENDIX

A microfiche appendix is attached to this application. The appendix, which includes a source code listing of an embodiment of the invention, includes nineteen frames on one microfiche. The programs thereof are written in C and designed to run with Microsoft Windows 3.1.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates to calibrating the colors produced by a digitally-controlled display device. ("Color" is used in a general sense to mean the hue, saturation, and value for light sources, or hue, shade, and value for objects. The term may also be used to encompass black, white, or grayscale.)

In digital photographic editing, photographs (or other images) are scanned and digitized, and then displayed on a computer monitor. A user can then alter certain attributes of the displayed digitized image, and the alterations appear on the computer monitor. Finally, the altered image can be printed on a hard copy output device.

SUMMARY OF THE INVENTION

The invention provides methods for calibrating the colors displayed by a digitally-controlled display device in response to digital inputs. Calibration according to the invention improves the subjective agreement between an image displayed on the calibrated device and the same image as displayed by a different display device. The invention finds particular use in editing of digital images, so that an image edited on a monitor calibrated by the method of the invention can be stored and later used to reproduce the digital image on, for instance, print media with a closely corresponding color balance.

In general, in a first aspect, the invention features a method for calibrating a display device, for instance, a computer monitor, that transduces digital inputs to regions of perceived color. The method includes the steps of: (1) supplying digital inputs to produce a white area and one or more color patch areas each having a perceived color other than white; (2) overlaying on the white area one or more filter chips that each produce a desired reference color; and (3) conforming the perceived color of each color patch and the perceived color produced by the corresponding filter chip, by adjusting the digital input for the color patch or the filter value of the filter chip.

In a second aspect, the invention features an optical filter that is particularly useful with the method described above. The filter has a substrate configured to allow the filter to be affixed to the face of a computer display monitor, and a plurality of filter chips, each having a known optical density and arranged on the substrate to facilitate color comparison of light transmitted through the filter chips with light from corresponding color patches displayed on the display monitor.

In a third aspect, the invention features a method for calibrating a brightness control of a display device, including the steps of: (1) supplying to the display device digital inputs that produce a black area and an adjacent dark gray area; (2) adjusting the brightness control of the display so that the black area and the gray area are distinguishable; and (3) slowly reducing the brightness control to the point where the black area and the gray area are indistinguishable.

Preferred embodiments may include any of the following features. Each filter chip has an associated density value denoting a light-filtering character of the filter chip, and this density value is received at a source of the digital inputs; the source produces the nominal color patch digital inputs according to the received density values. The color patch digital inputs are each adjusted to conform perceived hue, brightness, and saturation of each color patch to the corresponding reference color. The filter chips and color patches are of an essentially hueless neutral gray, even for full-color display devices. The position of the color patches can be adjusted to bring them into alignment with the corresponding filter chips. The filter chips are formed by printing half-tone areas on a transparent or translucent film. If the filter chips are on transparent film, a strip of translucent tape can be adhered to the film as a diffuser. The filter chips have an adhesive member to removably attach the optical filter to the display monitor face. Digital inputs supplied to the display device are adjusted to conform a white display region to a reference source of white light, thereby producing a calibrated white digital input for use in forming the white area. This white reference can be either a light box or a sheet of white paper. The adjusted digital inputs are stored in a form for later use in displaying a digital color image: when the image is displayed, color values of portions of the image having digital colors other than the nominal digital inputs are adjusted for display by interpolating between the nominal and adjusted digital inputs.

Among the advantages of the invention are the following. A display device can be calibrated quite precisely. The invention provides this calibration with a minimum of equipment: instead of an expensive photometer, the invention uses an inexpensive film overlay to produce a reference color, and a human eye to compare the reference color to the color produced by the display. The invention is easy to use; ordinary users can calibrate their display devices without requiring either the equipment or the knowledge of an expert.

Other objects, advantages and features of the invention will become apparent from the following description of a preferred embodiment, from the drawing, and from the claims.

BRIEF DESCRIPTION OF THE DRAWING

FIG. 3b is an edgewise view of the filter of FIG. 3a.

FIGS. 6a and 6b are pseudocode descriptions of routines that convert a digital color expressed in HSV color space to a color in RGB color space, and vice-versa.

DESCRIPTION OF A PREFERRED EMBODIMENT

Figures 1, 5:
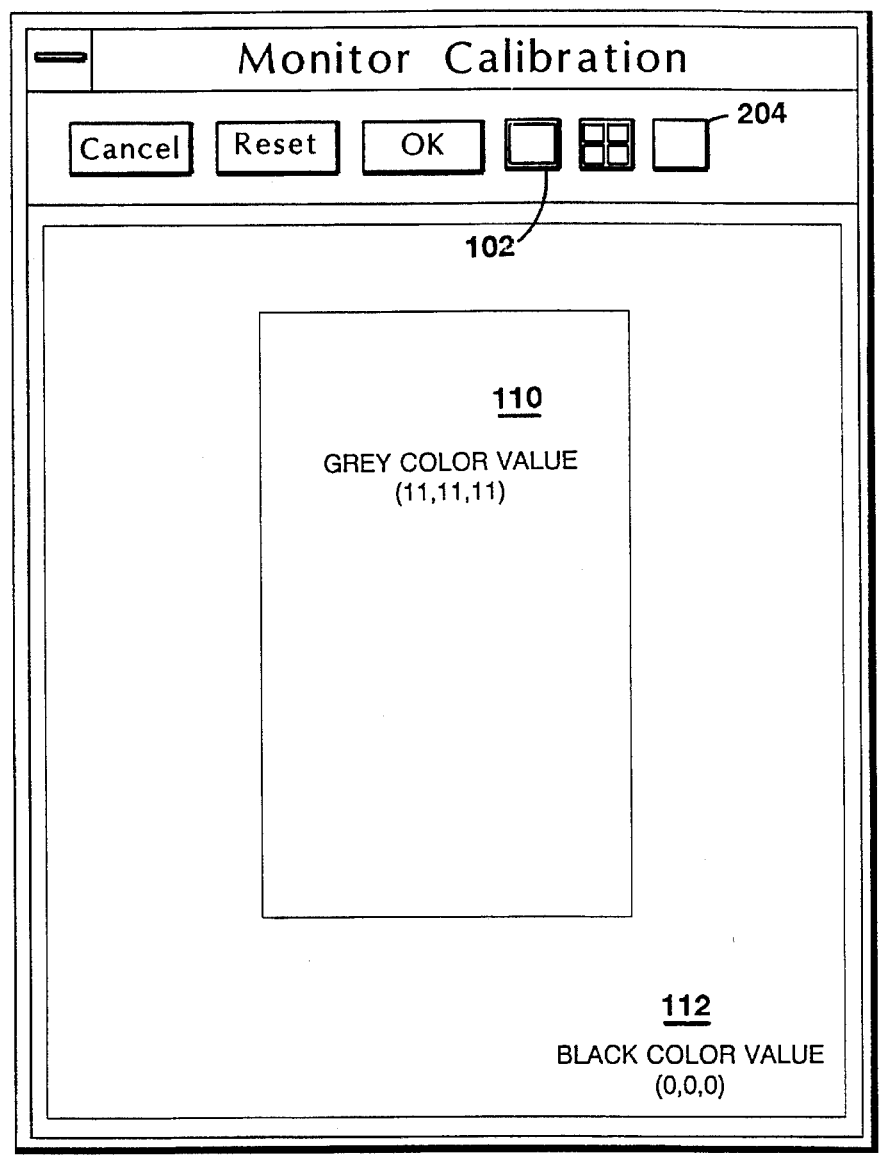
FIGS. 1, 2, and 4a are computer screen displays.
FIG. 5 is a table showing the memory of a computer.

The invention provides several techniques that allow precise calibration of a color display device. The techniques allow a user to precisely adjust the display device's brightness and contrast controls, white point, and gamma curve. In each of the techniques, a computer (or other controller) displays a screen (a collection of figures) on the display device, and the user provides adjustments to the display device or computer to achieve a particular color relationship between the displayed figures or between displayed figures and a reference. After calibration, information is stored in a memory of the computer. As future images are displayed, this stored information is used by the computer to adjust the nominal digital colors of the image to actual digital values for use by the calibrated device, so that the subjectively perceived color balance of the image as-displayed by the calibrated device will conform to the color balance of the image as it will be displayed on a standard monitor.

The gamma curve of a display monitor describes the relationship between the digital color values sent to the display and the brightness of the light emitted by the monitor in response. While the invention can be adapted to match any reasonably smooth gamma curve, the default is to use the gamma curve widely adopted by the television industry:

$$L = cv^\gamma$$

where L is a measure of the intensity of the light emitted by the monitor, v is the digital color value (expressed in a range from 0 to 1) sent to the display adapter, c is a scale factor, and γ (gamma) is a constant, with value typically set at 2.22. This curve approximates the response of the human visual system—a unit change in the value of v will be approximately equally perceptible over any part of the useable range for v.

Many computer display systems represent colors internally as three eight-bit numbers, one number for each of red (R), green (G), and blue (B). Eight bits allows each of the three values to range between 0 and 255. For such monitors, black is represented internally as the triple (R,G,B)=(0,0,0). The brightest possible red is represented internally as the triple (255,0,0), and the brightest possible white as the triple (255,255,255). Because this method for digitally representing colors is commonly used, it will be used as the example representation in this disclosure. Similarly, the discussion below describes using the invention to calibrate a display monitor, typically a CRT (cathode ray tube). Those of ordinary skill will appreciate that the invention can easily be adapted for use with display devices that use other digital color representations and other display technologies, for instance color printers, etc.

Because a viewer's impression of an image is influenced by various external factors such as room lighting and the color of room walls, it is desirable to establish normalized viewing conditions before beginning the calibration procedure. Room lighting should be very subdued, but not totally dark. No direct light should fall on the monitor, so that the monitor is free from glare or reflections. This can be achieved by shrouding the top and sides of the monitor with a viewing hood. The user sets the monitor into a desired display mode: for instance, 24-bit-per-pixel color (three eight-bit numbers for each of red, green, and blue, as discussed above), and dithering disabled. It is also desirable to allow the display monitor to warm up for a time, for instance fifteen minutes. The user turns the contrast control to maximum contrast.

Software for a preferred embodiment of the invention displays on the monitor a screen from which the user can select one of three calibration steps, brightness, white point, and gamma curve, which are preferably performed in this order.

Referring to FIG. 1, the user has clicked on the "brightness" button 102 of the menu screen. The invention displays two rectangles, a very dark gray rectangle 110 of color value (11,11,11) nested within a completely black rectangle 112 of color value (0,0,0). The user turns the brightness control up until gray rectangle 110 is clearly visible against the black background 112, and then down to the point that the difference between gray rectangle 110 and black rectangle 112 is barely perceptible at the border between the two rectangles. Then, the user decreases the brightness control until gray rectangle 110 just disappears against black background 112. The brightness control is now set at a calibrated level.

The goal of adjusting monitor brightness is to find a setting of the brightness control that yields the brightest possible image while leaving blacks as black as possible. Too low a brightness setting loses shadow detail; too high a setting makes the image washed out and reduces overall contrast.

Figure 2:
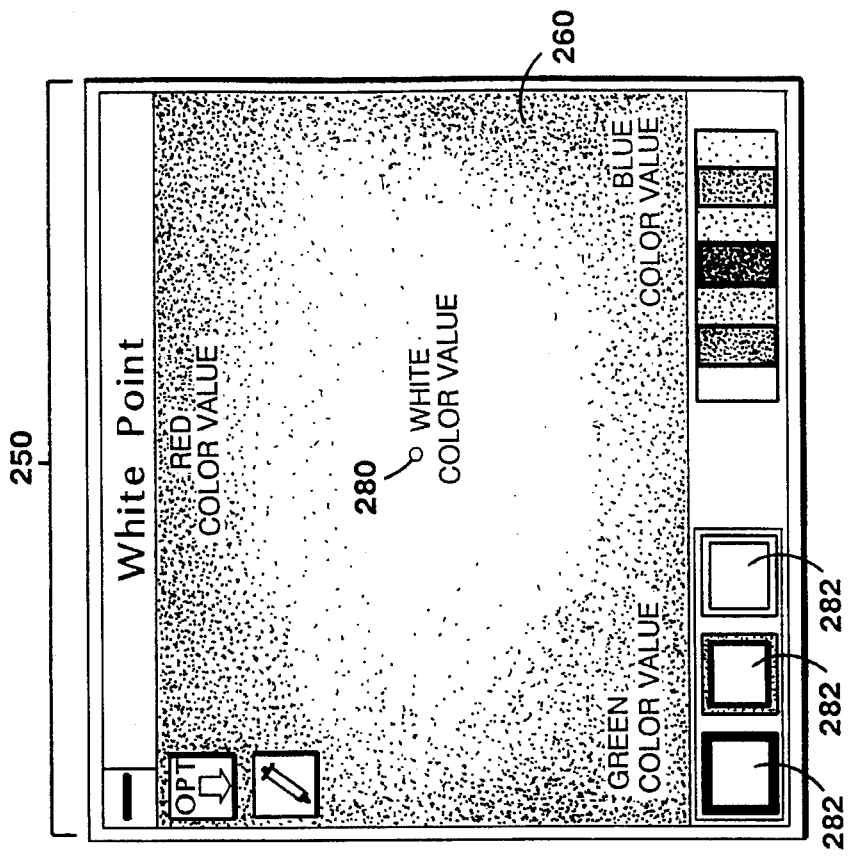
Figure 2:
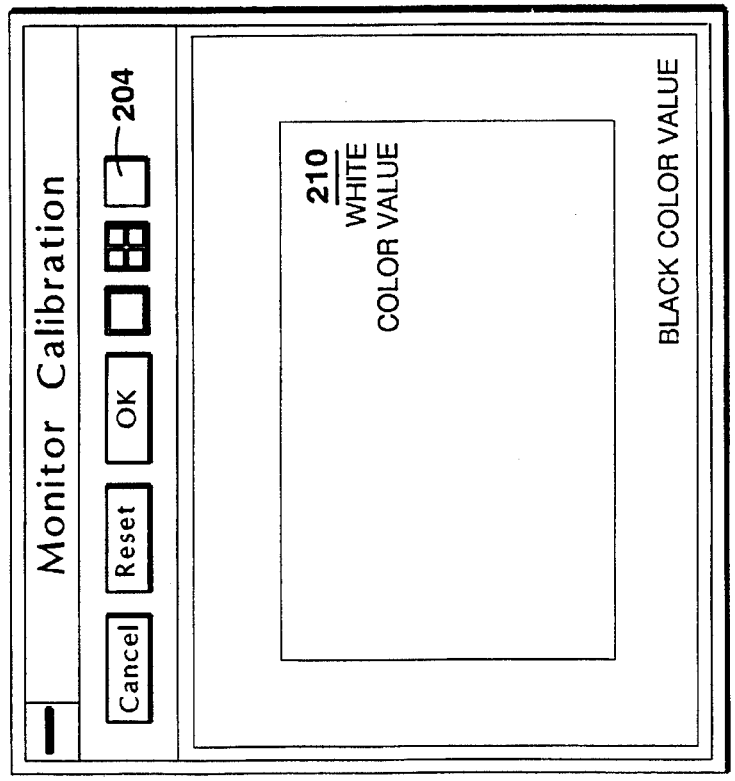

Referring to FIG. 2, the invention allows the user to adjust the white point of the monitor. Typically, the full white value (255,255,255) of a computer monitor has a slight blue cast compared to the illumination under which the final printed images will be viewed. The white point setting step allows a user to remove this blue by shifting this full white slightly toward the yellow-red. When the user clicks on button 204 to set the white point button, the invention displays a white rectangle 210 at full intensity and a color picker window 250. Color picker 250 displays in a display plane 260 the colors of the three full-intensity sides of the RGB color cube, with white (255,255,255) at the center, fading toward red (255,0,0) at the top, toward green (0,255,0) in the lower right, and toward blue (0,0,255) in the lower left. The point 280 in the color picker's color plane corresponding to the current white point is indicated with a circle, and shown in three panels 282 at the lower left, with respectively, black, gray, and white borders. The user compares white rectangle 210 with a reference white, for instance a daylight-corrected light box, or a piece of white paper held under a lamp of known color temperature, preferably corresponding to that in which final prints will be viewed. If white rectangle 210 has a noticeable hue cast compared to the white reference, the user uses a mouse to select a different point in the color picker's color plane 260 to use as full white. The color picker has two modes, a full mode in which the colors displayed in the color plane extend out to full red, green, and blue, and a pastel mode that displays a narrower set of colors in the same display space, allowing selection from a finer gradation of colors.

The white point step determines the highest possible values that produce a hueless white (for example, leaving the red value at 255 but reducing the green value to 253 and the blue value to 234).

Because color (255,255,255) typically is a bit too blue, it may be preferred to set the initial default white point at a value that takes this into account, for instance (255,255, 235).

Figure 3B:
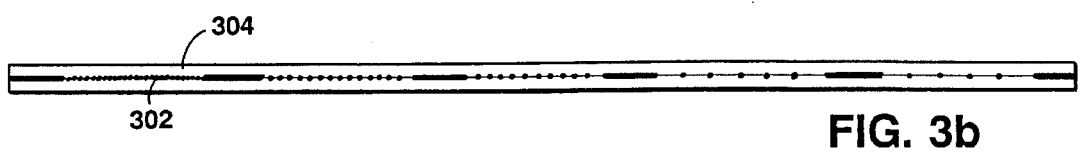
Figure 3A:
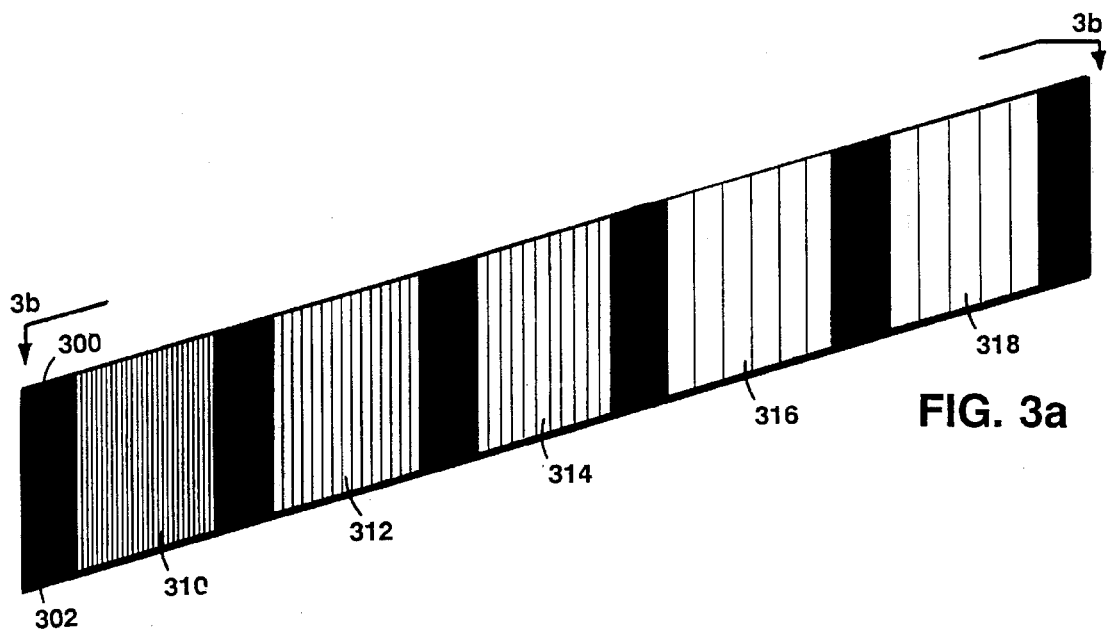
FIG. 3a is a perspective view of a novel light filter.

Referring to FIGS. 3a and 3b, the preferred system according to the invention uses an overlay film 300 to generate reference colors to which color patches displayed by the monitor will be conformed. Overlay 300 is about 4"×¾", made of plastic film 302, with a pattern of five filter chips 310–318, each having a different optical density.

Preferably, the overlay film is manufactured by phototypesetting a series of halftone screens onto plastic film. To reduce moiré interference between the monitor's shadow mask and the line frequency of the halftone screen, the overlay pattern may be printed on translucent film, or alternately, a translucent diffuser may be applied after photoprinting, for instance by applying a layer of clear plastic adhesive tape 304, Scotch 810 Magic Tape for example, to the emulsion or printed side of the film. Alternately, overlay film 300 can be produced by photographing a set of gray filter chips onto transparency film; the developed film can then be used directly as the overlay. While the present embodiment uses five filter chips 310–318 and five corresponding color patches, any reasonable number could be used. Though overlay films are manufactured to be as uniform as possible, some variation is inevitable. Thus, each filter chip is preferably measured with an optical transmission densitometer, and the five measured density values recorded on an envelope in which overlay film 300 is shipped to the user.

The commercial product under development by the assignee takes advantage of the fact that most computer monitor screens use the same phosphors, thus eliminating in effect this potential variable from consideration. As a result, it has been discovered that adequate calibration can readily be achieved using filter chips and corresponding color patches of hueless neutral gray. Thus, although with monitors employing nonstandard phosphors or other display technologies, more technically perfect calibration might be achieved using one or more sets of filters chips of varying hues, a single overlay of hueless grayscale filter chips permits adequate calibration with most monitors. For illustration only, then, the following description is based on the use of grayscale filter chips and color patches. Color patches of non-neutral hue would be useable in a similar fashion.

Figures 4A, 4B:
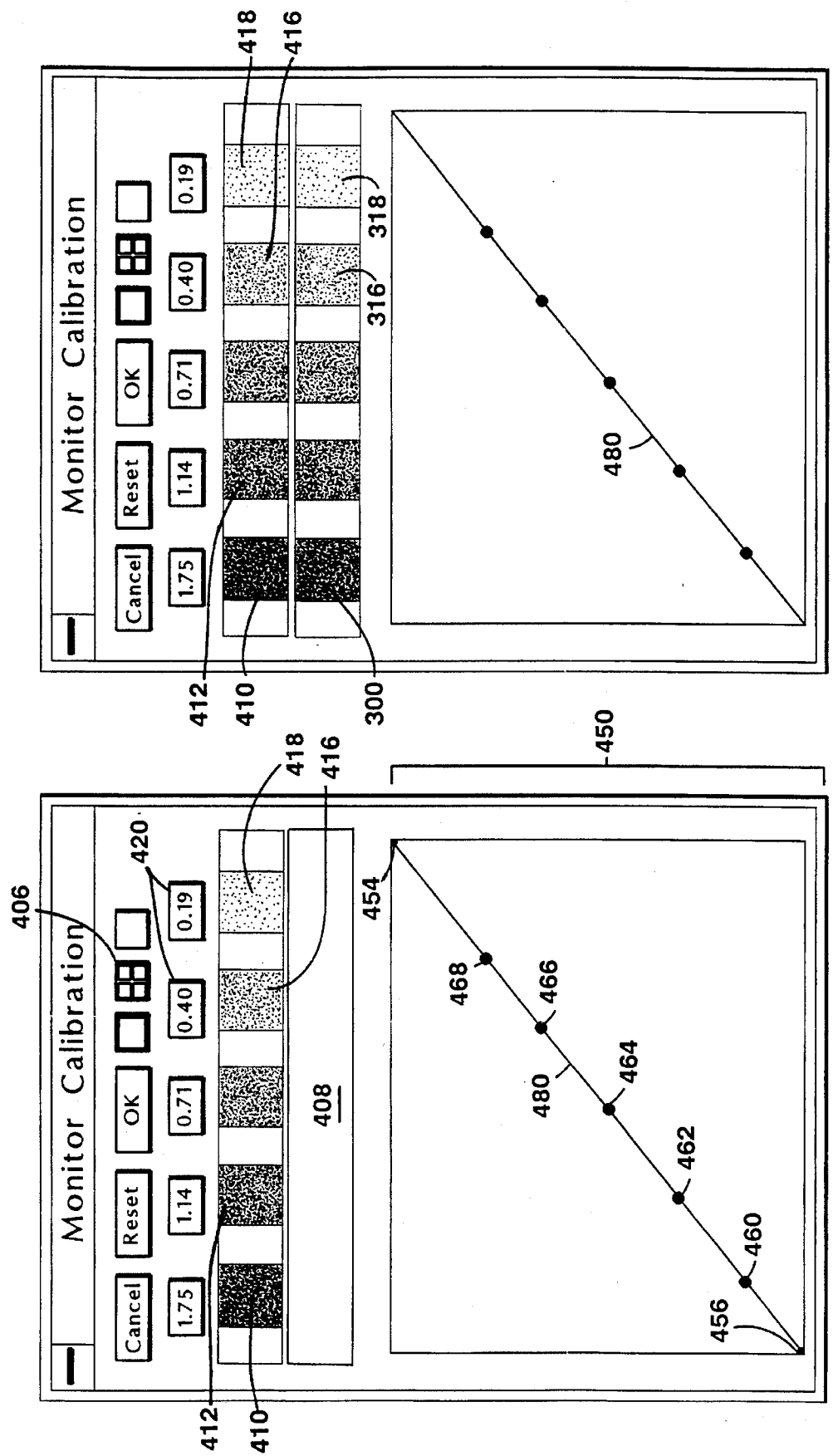
FIGS. 4b–4d show computer screen displays with the filter of FIG. 3a affixed.

Referring to FIG. 4a, the user clicks on the gamma curve adjust button 406 to start the gamma curve adjustment step, in which he will use overlay film 300. In this step, the response curves for the display system's transducing of red, green, and blue digital color values to perceived color intensities are adjusted so that the perceived response to nominal digital colors will match a selected gamma curve. Thus, numerically balanced grays will be displayed as hueless neutral grays. The gamma adjustment step uses the screen of FIG. 4, which has an area 408 of calibrated bright white (the color of this white area is the white point established as discussed in connection with FIG. 2, above), five gray patches 410–418, and a gamma curve graph 450. The user affixes overlay 300 over white area 408, as shown in FIG. 4b, so that the five filter chips 310–318 are each adjacent to the corresponding displayed gray patch 410–418. Preferably, the diffuser side of the overlay is placed against the monitor screen.

The values in boxes 420 are used to generate the digital colors displayed in gray patches 410–418 and should correspond to the densities of the respective filter chips as measured with a transmission densitometer; if the actual overlay has different density values than those displayed in boxes 420, the user clicks on the appropriate density value box 420 to enter the overlay's corresponding density values into the computer.

The nominal digital colors for the gray patches 410–418 are computed from the optical densities of the filter chips 310–318 (either the initial defaults or the densities entered by the user, as in the previous paragraph) and the desired gamma curve. If the optical density of the ith filter chip is D[i], then the transmittance T[i] of the ith filter chip is $$T[i]=10^{-D[i]}$$

An ideal monitor (one whose gamma curve precisely matches the theoretical gamma curve) would render a gray patch whose digital color level V[i] of the ith gray patch $$V[i]=255\times T[i]$$

as a perceived gray precisely matching the light transmitted through the ith filter chip. Any deviation between the brightness or hue of the monitor's gray patches 410–418 and the filter chips 310–318 indicates a deviation of the monitor from a perfect exponential gamma curve response. The difference between the nominal digital color values (computed by these formulae) and the actual digital color values that in fact produce the perceived color can be measured and stored.

Figure 4D:
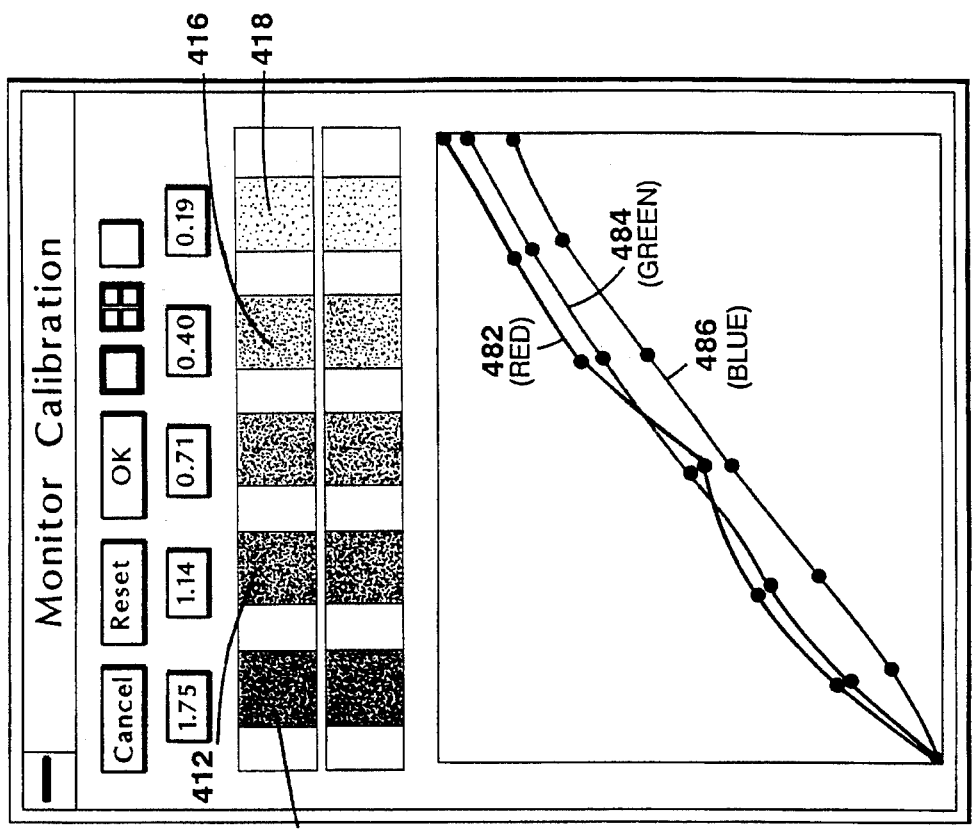
Figure 4C:
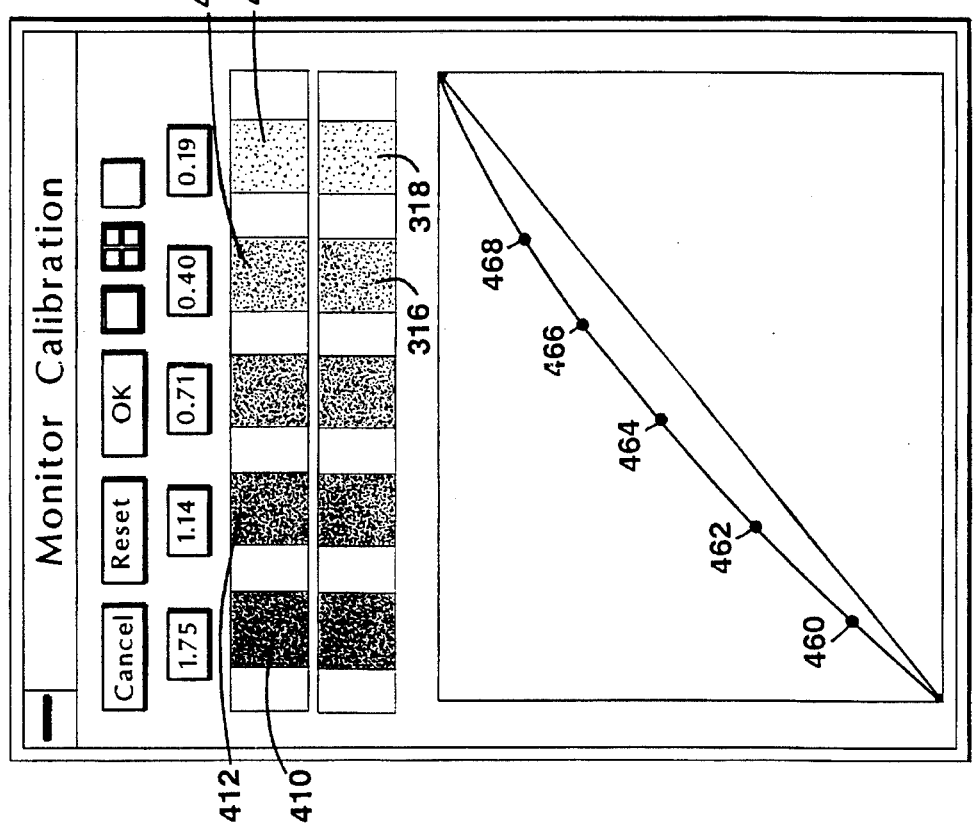

Referring to FIG. 4c, the user adjusts the brightness of any one of gray patches 410–418 by mouse-clicking on the associated point 460–468 on the gamma curve display and dragging the point up or down. The computer driving the monitor is programmed to respond to this dragging by increasing or decreasing the digital color values driving the corresponding gray patch 410–418, in turn altering the perceived brightness of the gray patch. The user adjusts the brightness level using the points 460–468 until the brightness level of the gray patch 410–418 matches the brightness level transmitted through the filter chip 310–318 from white area 408. As the user adjusts the brightness level of each of the five gray points 460–468, the displayed gamma curve 480 is refit to the seven points (the five points 460–468 of the gamma plot, plus black (0,0,0) point 456 and the white point 454 selected in FIG. 2).

At this point, the displayed gamma curve provides feedback to cross-check whether the brightness setting of FIG. 1 was performed correctly. If the calibrated gamma curve lies mostly above the theoretically perfect 45° line 480, then the brightness is set too low. The user should set the brightness setting again, as discussed in connection with FIG. 1, leaving the brightness a bit higher. If the curve is mostly below the 45° line, the brightness is too high, and should be turned down a bit.

Referring to FIG. 4d, the user may then fine tune the hue of each of the gray patches. If any of the gray patches 410–418 have a non-neutral hue, the user clicks on that gray patch, and the computer responds by displaying a color picker window similar to 250 of FIG. 2. (The colors of this color picker display are displayed at full brightness, even though the gray patch being adjusted has attenuated brightness.) Similar to the white point setting step, the user uses the mouse to select a hue and saturation from the displayed color plane 260, and the computer responds by changing the digital color supplied to the monitor, which in turn makes corresponding alterations to the perceived color of the selected gray patch 410–418. The displayed gamma curve 450, previously displayed as a single gray curve, splits into separate red, green, and blue curves 482, 484, 486, showing the gamma variations for each of the three component colors.

The monitor calibration data (the white point setting and the five adjusted digital color values for the five gray patches) can be stored in a file so that the full monitor calibration procedure need not be repeated for every image editing session.

The software may also provide a "reset" feature to reset the white point to its full value of (255,255,255), and to return the gamma curve to its color identity default.

Referring to FIG. 5, as the user adjusts the brightness level and hue of each of the five points on the gamma curve, the computer associates two color values: the computed nominal digital color value that should have matched the gray patch to the filter chip, and the actual digital color that perceptibly matches the gray patch to the filter chip. The association is by means of a gamma curve lookup table 500. The table is of dimension 3×256, corresponding to the nominal digital color values 502 for each of red, green and blue 504. Each table entry is the actual digital color that produces the perceived color desired for the associated nominal digital color. Lookup table entries between the seven calibration points are computed by a seven-point curve fit, for instance using Hermite monotone cubic spline interpolation, as described in *Monotone Piecewise Cubic Interpolation* by F. N. Fritsch et al. in *SIAM Journal of Numerical Analysis*, vol. 17, no. 2 (April 1980), pp. 238–246. Thus, lookup table 500 will be used to reverse any color distortions that an uncalibrated monitor would have imparted to the display of an image.

Referring to FIG. 5, consider, as an example, a pixel of an image with a nominal digital color value of (R,G,B)=(17, 15,12) and a lookup table as shown in FIG. 5. The software that displays this pixel on the calibrated monitor will index to the three entries of the lookup table corresponding to red value 17, green value 15, and blue value 12 (indicated with heavy boxes around the entries). In the lookup table, these nominal values translate to red 16 (slightly decreasing the red), green 15 (leaving the green unaffected), and 14 (slightly increasing the blue). Thus, the actual digital values supplied to the display device would be (R,G,B)=(16,15,14). These corrected digital color values compensate for the distortions of the monitor, and allow the pixel to be displayed in proper color balance with the other pixels of the image.

Referring to FIGS. 6a and 6b, most display devices represent colors in RGB color space. But much of the software of the invention represents colors in the HSV color space: H is hue, S is saturation, and V is value. For instance, when points 460–468 are moved, the brightness of gray patches 410–418 are adjusted by raising or lowering the V coordinate while holding H and S constant. The color adjustment is performed by varying H and S while holding V constant. FIG. 6a shows the conversion from HSV to RGB, and FIG. 6b shows conversion from RGB to HSV. In both routines, H is hue, represented as a value between 0° and 360°, with red at 0°. S is saturation and V is value, both represented as values between 0 and 1. R, G, and B are represented as values between 0 and 1. "Floor" is the floor function, rounding down to the nearest integer. "Max" is the maximum function, and "Min" is the minimum function. The pseudocode notation allows multiple assignments, for instance "(R,G,B)=(V,K,M)" means R=V, G=K, and B=M.

Other embodiments and uses of the invention are within the following claims. A few examples follow.

The white area and filter chips could be relatively large, allowing a user to compare larger color areas. The calibration of each color patch to the corresponding filter chip would include the step of replacing the filter on the monitor screen for each color to be calibrated.

The filter chips could deliberately introduce a hue, to calibrate colors lying off the curve of numerically-balanced grays. In one example, a series filter chips could be created that, when successively overlaid on white area 408, produce colors at selected points within a color space, for instance a 9×9×9 matrix of color values in the RGB color space. The user would use the techniques described above to conform a color patch to each of the filter chips. These actual numerical inputs would be stored associated with the nominal inputs corresponding to the filter chip values. During display, a three-dimensional interpolation technique could be used to interpolate the values of uncalibrated colors in accordance with the color transformation values established for the calibrated points.

The gamma calibration method can be used with hard copy printers. For instance, a test pattern with a white area and a color patch would be printed, and a user would overlay a filter onto the white area and compare the result. In devices where it is relatively difficult to re-print the test pattern, it may be desirable to provide a graduated series of filter chips so that the user can select the filter chip from the series that best matches a given color patch of the printer output, rather than the trial-and-error adjustment of the device's numerical input discussed above. After a filter chip and a color patch are matched, a new test pattern would be printed for confirmation. The translucent diffuser techniques of FIGS. 3*a* and 3*b* would not be required for applications with devices, like most printers, that do not have shadow masks or other discretely-identifiable "pixels."

The described gamma correction step can be used with other methods of adjusting the other parameters (white point, brightness, contrast, etc.) of the display device.

In one possible application of the foregoing technology, among many others, a photographer would send exposed film to Kodak or another processor to be digitized onto a CD ROM. Using her personal computer with a CD ROM drive and image editing software, the photographer would edit a digitized image. Prior to editing, she would first calibrate the computer's monitor. The resulting edited image values would be written to a disk file, which could be sent to a high quality print shop. The final print would closely match the image as it was displayed on the computer monitor.

What is claimed is:

1. A method of setting a color computer monitor's gamma curve to a standard condition so that color images displayed on the monitor's screen from a file match color images produced on another medium from a copy of the same file, comprising the steps of displaying a uniform white area on the screen;

displaying an array of discrete screen patches of gray in graduated shades adjacent to said white area on the screen;

placing over the white area on the screen an overlay film bearing filter patches of predetermined graduated optical densities corresponding to the array of screen patches so that the white area provides illumination through the overlay film;

visually comparing the screen patches with the illuminated filter patches one at a time;

adjusting the display of each screen patch independently to match the corresponding filter patch without affecting the display of the white area or other screen patches;

storing values indicative of the extent of adjustment necessary to conform each respective screen patch to the corresponding filter patch; and using the stored values to compensate the monitor's inherent gamma curve to achieve a better match between displayed color images from a file and images produced by another media from a copy of the same file.

2. The method of claim 1, further comprising the step of:

printing half-tone areas on a transparent or translucent film to form said overlay film.

3. The method of claim 2 wherein said overlay film is formed on transparent film, the method further comprising the step of adhering a strip of translucent tape to said film as a diffuser.

4. The method of claim 1, further comprising the steps of:
   simultaneously displaying on the screen a curve representing the uncompensated gamma curve of the monitor; and
   selecting a point on the screen curve corresponding to the color of one of the screen patches, and dragging the selected point up or down to adjust the color displayed in the corresponding screen patch.

5. The method of claim 1, wherein said other media is a color printer.

* * * * *